(12) United States Patent
Ghazali et al.

(10) Patent No.: US 11,923,978 B1
(45) Date of Patent: Mar. 5, 2024

(54) MULTI-PORT TRANSCEIVER

(71) Applicant: Marvell Asia Pte Ltd, Singapore (SG)

(72) Inventors: Sabu Ghazali, Fremont, CA (US); Lenin Patra, Dublin, CA (US); Jeng-Jong Douglas Chen, Santa Clara, CA (US); Dong-Seok Youm, San Jose, CA (US); Tunghao Tsai, Cupertino, CA (US); Kong Chuan Susanto, Cupertino, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 17/744,478

(22) Filed: May 13, 2022

Related U.S. Application Data

(60) Provisional application No. 63/188,357, filed on May 13, 2021.

(51) Int. Cl.
*H04L 1/00* (2006.01)
*H04B 1/40* (2015.01)
*H04L 49/00* (2022.01)

(52) U.S. Cl.
CPC .......... *H04L 1/0071* (2013.01); *H04B 1/40* (2013.01); *H04L 49/30* (2013.01)

(58) Field of Classification Search
CPC .......... H04L 1/0071; H04L 49/30; H04B 1/40
See application file for complete search history.

(56) References Cited

U.S. PATENT DOCUMENTS

| | | | |
|---|---|---|---|
| 7,499,500 B2 | 3/2009 | Page | |
| 8,259,748 B2 | 9/2012 | Barrass | |
| 11,088,876 B1 | 8/2021 | Farjadrad | |
| 2002/0089929 A1* | 7/2002 | Tallegas | H04L 47/20 370/395.21 |
| 2003/0046496 A1* | 3/2003 | Mitchem | G06F 13/1689 711/147 |
| 2008/0279567 A1* | 11/2008 | Huang | H04J 14/025 398/168 |
| 2022/0353001 A1 | 11/2022 | Hu et al. | |

FOREIGN PATENT DOCUMENTS

WO    2021016410 A1    1/2021

OTHER PUBLICATIONS

"Marvell 88X3540 Quad-Port 10GbE copper PHY," Marvell, Nov. 2020 (2 pages).
"Marvell Alaska 88E2180/88E2110—Octal 10/100/1000/2.5G/5GBASE-T Ethernet Transceiver," Marvell, Jul. 1, 2021 (160 pages).
"Marvell Alaska M Multi-Gigabit Ethernet Transceivers," Marvell, Nov. 2020 (2 pages).

* cited by examiner

*Primary Examiner* — Sung S Ahn

(57) ABSTRACT

A multi-port transceiver comprises a plurality of first ports, a first communication interface, and a second communication interface. Multi-rate interleaver circuitry interleaves i) a plurality of first data streams, each received via a respective first port at a first data rate, and ii) a second data stream received via the first communication interface at a second data rate, to generate a third data stream to be transmitted via the second communication interface at a third data rate. Multi-rate deinterleaver circuitry deinterleaves a fourth data stream that was received via the second communication interface at the third data rate into i) a plurality of fifth data streams, each fifth data stream to be transmitted via a respective first port at the first data rate, and ii) a sixth data stream to be transmitted via the first communication interface at the second data rate.

18 Claims, 6 Drawing Sheets

MULTI-PORT TRANSCEIVER

CROSS REFERENCES TO RELATED APPLICATIONS

This application claims the benefit of U.S. Provisional Patent Application No. 63/188,357, entitled "8 Port Octal OXGMII Architecture," filed on May 13, 2021, which is incorporated herein by reference in its entirety for all purposes.

FIELD OF TECHNOLOGY

The present disclosure relates generally to network communications, and more particularly to aggregating data received from multiple ports for transmitting via a single higher speed port.

BACKGROUND

USXGMII-M is an architecture for conveying data from multiple network ports over a single physical layer-media access control layer (PHY-MAC) interface. In a common use case, the multiple network ports typically correspond to copper cables such as CAT5 or CAT5E cables, whereas the single PHY-MAC interface corresponds to an optical cable. For example, UTSXGMII-M describes an architecture for conveying data between four 2.578125 gigabits per second (Gbps) ports and a single PHY-MAC interface having a 10.3125 Gbps serializer-deserializer (SERDES). USXGMII-M also describes an architecture for conveying data between eight 2.578125 Gbps ports and a single PHY-MAC interface having a 20.625 Gbps SERDES.

SUMMARY

In an embodiment, a first multi-port transceiver comprises: a plurality of first ports that are configured to communicatively couple with a plurality of first communication cables, each first port configured to operate at a first data rate; a first communication interface that is configured to transmit and receive data at a second data rate higher than the first data rate; a second communication interface that is configured to transmit and receive data at a third data rate higher than the second data rate; multi-rate interleaver circuitry that is configured to interleave i) a plurality of first data streams, each received via a respective first port at the first data rate, and ii) a second data stream received via the first communication interface at the second data rate, to generate a third data stream to be transmitted via the second communication interface at the third data rate; and multi-rate deinterleaver circuitry that is configured to deinterleave a fourth data stream that was received via the second communication interface at the third data rate into i) a plurality of fifth data streams, each fifth data stream to be transmitted via a respective first port at the first data rate, and ii) a sixth data stream to be transmitted via the first communication interface at the second data rate.

In another embodiment, a method for operating a first multi-port transceiver includes: receiving a plurality of first data streams via respective first ports of the first multi-port transceiver, including receiving each first data stream at a first data rate; receiving a second data stream via a first communication interface at a second data rate higher than the first data rate; interleaving i) the plurality of first data streams, each received via a respective first port at the first data rate, and ii) the second data stream received at the second data rate, to generate a third data stream to be transmitted via a second communication interface at a third data rate higher than the second data rate; transmitting the third data stream via the second communication interface at the third data rate; receiving a fourth data stream via the second communication interface at the third data rate; deinterleaving the fourth data stream into i) a plurality of fifth data streams, each fifth data stream to be transmitted via a respective first port at the first data rate, and ii) a sixth data stream to be transmitted via the first communication interface at the second data rate; transmitting the plurality of fifth data streams via respective first ports of the first multi-port transceiver, including transmitting each fifth data stream at the first data rate; and transmitting the sixth data stream via the first communication interface at the second data rate.

DETAILED DESCRIPTION

Figure 1:
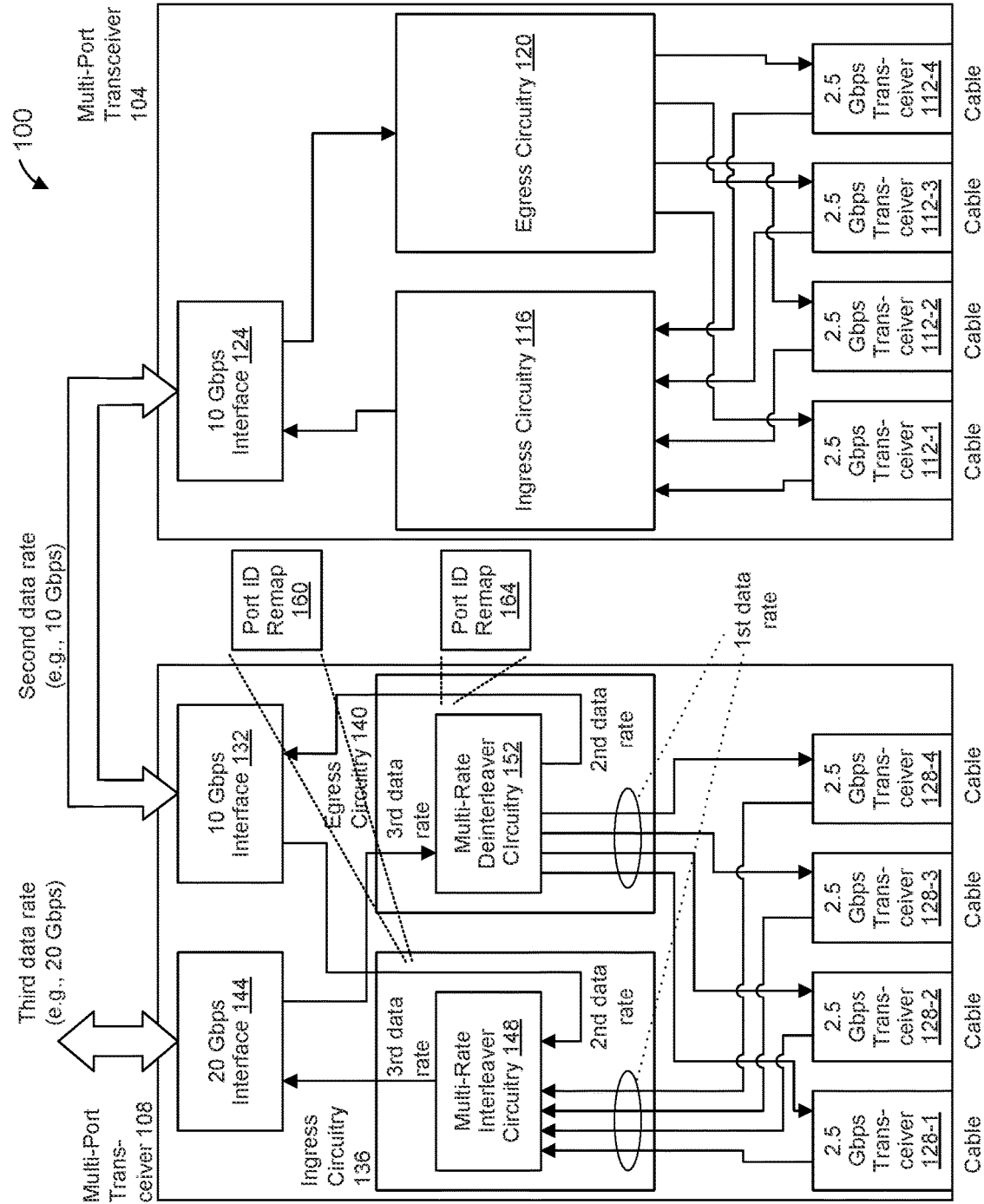
FIG. 1 is a simplified block diagram of an example multi-port transceiver system in which a first multi-port transceiver is cascaded with a second multi-port transceiver, according to an embodiment.

In embodiments described below, a multi-port transceiver includes a multi-rate interleaver that is configured to interleave multiple data streams corresponding to different transmission rates into a single other data stream corresponding to a higher transmission rate. For example, the multi-rate interleaver is configured to interleave i) first data streams from first ports of the multi-port transceiver operating at a first transmission rate and ii) a second data stream from a first interface of the multi-port transceiver operating at a second transmission rate that is higher than the first transmission rate, to generate a third data stream to be provided to a second interface of the multi-port transceiver operating at a third transmission rate that is higher than the second transmission rate.

In embodiments described below, the multi-port transceiver also includes a multi-rate deinterleaver that is configured to deinterleave a single data stream into multiple other data streams corresponding to different transmission rates. For example, the multi-rate deinterleaver is configured to deinterleave a fourth data stream from the second interface operating at the third transmission rate into i) fifth data streams to be provided to the first ports operating at the first transmission rate and ii) a sixth data stream to be provided to the first interface operating at the second transmission rate.

Use of multi-port transceivers having such multi-rate interleavers and/or multi-rate deinterleavers facilitates scalable solutions for implementing multi-port transceiver systems with a scalable number of ports. As an illustrative example, two multi-port transceivers, each having four 2.578125 Gbps (sometimes referred to herein as 2.5 Gbps) ports, can be cascaded to form a multi-port transceiver system with eight 2.5 Gbps ports; the example multi-port transceiver system interleaves data streams from the eight 2.5 Gbps ports into a single 20.625 Gbps data stream, and that deinterleaves a single 20.625 Gbps (sometimes referred to herein as 20 Gbps) data stream into data streams for the eight 2.5 Gbps ports. In this illustrative example, a first multi-port transceiver interleaves data streams from four 2.5 Gbps ports into a single 10 Gbps (sometimes referred to herein as 10 Gbps) data stream and provides the single 10 Gbps data stream to a second multi-port transceiver that utilizes a multi-rate interleaver and a multi-rate deinterleaver such as describe herein. The multi-rate interleaver of the second multi-port transceiver interleaves data streams from four 2.5 Gbps ports and the 10 Gbps data stream from the first multi-port transceiver into a single 20 Gbps data stream that is output by the second multi-port transceiver. Similarly, the multi-rate deinterleaver of the second multi-port transceiver deinterleaves a single 20 Gbps data stream received by the second multi-port transceiver into i) four data streams to be provided to four 2.5 Gbps ports of the second multi-port transceiver and ii) a 10 Gbps data stream to be provided to the first multi-port transceiver. The first multi-port transceiver then deinterleaves the 10 Gbps data stream into four data streams to be provided to four 2.5 Gbps ports of the first multi-port transceiver.

FIG. 1 is a simplified block diagram of an example multi-port transceiver system 100 in which a first multi-port transceiver 104 is cascaded with a second multi-port transceiver 108, according to an embodiment. The first multi-port transceiver 104 includes a plurality of ports 112. Although four ports 112 are illustrated in FIG. 1, the first multi-port transceiver 104 includes other suitable numbers of ports in other embodiments (e.g., 2, 5, 8, 10, etc., ports). Each port 112 is configured to receive a respective receive signal via a suitable communication medium (e.g., a CAT5 cable, a CAT5E cable, a CAT6 cable, a coaxial cable, etc.) at a transmission rate of 2.5 Gbps, and to generate a respective data stream to be provided to ingress circuitry 116 at a data rate of 2.5 Gbps. Similarly, each port 112 is configured to receive a respective data stream from egress circuitry 120 at a date rate of 2.5 Gbps, and to generate a respective transmit signal for transmission via the communication medium (e.g., a CAT5 cable, a CAT5E cable, a CAT6 cable, a coaxial cable, etc.) at the transmission rate of 2.5 Gbps.

In other embodiments, each port 112 is configured to receive and transmit signals via the communication medium at a suitable transmission rate different than 2.5 Gbps, and/or each port 112 is configured to generate data to be provided to the ingress circuitry 116 and to receive data from the egress circuitry 120 at a suitable date rate different than 2.5 Gbps.

In some embodiments, each port 112 is configurable to receive and transmit signals via the communication medium at different rates while generating data to be provided to the ingress circuitry 116 and receiving data from the egress circuitry 120 at a fixed date rate. For example, each port 112 is configured to implement data duplication to convert data received via the communication medium at a first data rate to generate data to be provided to the ingress circuitry 116 at a higher second data rate; and each port 112 is configured to implement data deduplication to convert data received from the egress circuitry 120 at the second data rate to the slower first data rate for transmission via the communication medium. As merely an illustrative example, each port 112 is configurable to transmit and receive via the communication medium at a plurality of different transmission rates including 2.5 Gbps and one or more of 1 Gbps, 100 megabits per second (Mbps), and 10 Mbps, while generating generate data to be provided to the ingress circuitry 116 at a fixed data rate of 2.5 Gbps and receiving data from the egress circuitry 120 at the fixed data rate of 2.5 Gbps. In such an embodiment, when the port 112 is transmitting/receiving via the communication medium at a transmit rate less than 2.5 Gbps (e.g., 1 Gbps, 100 Mbps, 10 Mbps, etc.), the port 112 uses data duplication to generate data to be provided to the ingress circuitry 116 at 2.5 Gbps, and uses data deduplication to convert data received from the egress circuitry 120 at the data rate of 2.5 Gbps to the slower data rate for transmission via the communication medium.

The ports 112 provide data to the ingress circuitry 116 and receive data from the egress circuitry 120 at a same date rate.

The ingress circuitry 116 is configured to interleave the data received from the plurality of ports 112 to generate a higher data rate stream (i.e., higher than the data rate at which the ports 112 are providing data to the ingress circuitry 116) to be output by a communication interface 124. In an embodiment, the communication interface 124 includes a serializer/deserializer (SERDES). In the embodiment illustrated in FIG. 1, the communication interface 124 is configured to (e.g., the communication interface 124 includes a SERDES configured to) operate at data rate (10 Gbps) that is four times the data rate (2.5 Gbps) at which each of the ports 112 is providing data to the ingress circuitry 116. More generally, when the multi-port transceiver 104 includes N ports 112, where N is a suitable integer greater than one, the communication interface 124 is configured to operate at data rate of at least N times the rate at which each of the ports 112 provides data to the ingress circuitry 116.

The egress circuitry 120 is configured to deinterleave a data stream received from the interface 124 at the higher data rate into a plurality of data streams to be provided to the plurality of ports 112 at the same lower data rate. In the embodiment illustrated in FIG. 1, the egress circuitry 120 deinterleaves data received from the communication interface 124 at 10 Gbps into four data streams to be provided to the ports 112 at 2.5 Gbps. More generally, when the multi-port transceiver 104 includes N ports 112, the egress circuitry 120 deinterleaves data received from the communication interface 124 into four data streams each at 1/N times the data rate at which the interface 124 provides data to the egress circuitry 120.

The second multi-port transceiver 108 similarly includes a plurality of ports 128 the same as or similar to the ports 112 of the first multi-port transceiver 104. Although four ports 28 are illustrated in FIG. 1, the second multi-port transceiver 108 includes other suitable numbers of ports 128 in other embodiments (e.g., 2, 5, 8, 10, etc., ports).

The second multi-port transceiver 108 also includes an interface 132 that is configured to communicatively couple to, and operate at a same data rate as, the interface 124 of the first multi-port transceiver 104. In an embodiment, the interface 132 is the same as or similar to the interface 124 of the first multi-port transceiver 104. In the embodiment illustrated in FIG. 1, the communication interface 132 is configured to (e.g., the communication interface 132 includes a SERDES configured to) operate at 10 Gbps. More generally, when the multi-port transceiver 108 includes M ports 128, where M is a suitable integer greater than one, the communication interface 132 is configured to operate at data rate of at least M times the rate at which each of the ports 128 provides data to ingress circuitry 136 of the second multi-port transceiver 108.

The ingress circuitry 136 is configured to interleave i) the data received from the plurality of ports 128, each received at a first data rate, and ii) data received via the interface 132 at a second data rate (higher than the first data rate), to generate a data stream at a third data rate that is higher than the second data rate, the data stream at the third data rate to be output by a communication interface 144. In an embodiment, the communication interface 144 includes a SERDES. In the embodiment illustrated in FIG. 1, the communication interface 144 is configured to (e.g., the communication interface 144 includes a SERDES configured to) operate at a data rate (20 Gbps) that is at least eight times the data rate (2.5 Gbps) at which each of the ports 112, 128 is providing data to the ingress circuitry 116 and the ingress circuitry 136, respectively. More generally, when the multi-port transceiver 104 includes N ports 112 and the multi-port transceiver includes M ports 128, the communication interface 144 is configured to operate at data rate of at least N+M times the rate at which each of the ports 112, 128 provides data to the ingress circuitry 116 and the ingress circuitry 136, respectively. In some embodiments, N is equal to M. In some embodiments, N and M are both equal to four. In other embodiments, N and M have other suitable values.

The data received via the interface 132 includes interleaved data from the plurality of ports 112 of the first multi-port transceiver 104. Accordingly, when the ingress circuitry 136 interleaves i) the data received from the plurality of ports 128 and ii) the data received via the interface 132, the ingress circuitry 136 is interleaving i) the data received from the plurality of ports 128 of the multi-port transceiver 108 and ii) the data received from the plurality of ports 112 of the multi-port transceiver 104.

The ingress circuitry 136 includes multi-rate interleaver circuitry 148 that is configured to receive i) a plurality of first data streams each at the first data rate, and ii) a second data stream at the second data rate that is higher than the first data rate. In an embodiment, the second data rate is N times the first data rate. The multi-rate interleaver circuitry 148 is further configured to interleave i) the plurality of first data streams, each received at the first data rate, and ii) the second data stream at the second data rate, to generate a third data stream at the third data rate. In an embodiment, the third data rate is N+M times the first data rate.

The second data stream received by the multi-rate interleaver circuitry 148 at the second data rate includes interleaved data from a plurality of fourth data streams (e.g., data streams from the plurality of ports 112 of the multi-port transceiver 104), each at the first data rate, according to an embodiment. Accordingly, the multi-rate interleaver circuitry 148 is configured to interleave i) the plurality of first data streams, each received at the first data rate, and ii) the second data stream, which is an interleaving of the plurality of fourth data streams, each at the first data rate. When the number of data streams in the plurality of first data streams is M and the number of data streams in the plurality of fourth data streams is N, the third data rate is N+M times the first data rate, according to an embodiment.

The egress circuitry 140 is configured to receive a fifth data stream from the interface 144 at the third data rate, and deinterleave the fifth data stream into i) a plurality of sixth data streams to be provided to the plurality of ports 128, each at the first data rate, and ii) a seventh data stream to be provided to the interface 132 at the second data rate.

The seventh data stream provided to the interface 132 includes interleaved data corresponding to the plurality of ports 112 of the first multi-port transceiver 104. Accordingly, when the egress circuitry 140 deinterleaves the fifth data stream received from the interface 144 into i) the plurality of sixth data streams, each at the first data rate, to be provided to the plurality of ports 128, and ii) the seventh data stream to be provided to the interface 132, the egress circuitry 140 is deinterleaving the fifth data stream received from the interface 144 into i) data to be provided to the plurality of ports of the multi-port transceiver 108, and ii) data to be provided to the plurality of ports 112 of the mufti-port transceiver 104.

The egress circuitry 140 includes multi-rate deinterleaver circuitry 152 that is configured to receive the fifth data stream received from the interface 144 at the third data rate. The multi-rate deinterleaver circuitry 152 is further configured to deinterleave the fifth data stream into i) the plurality of sixth data streams, each at the first data rate, and ii) the seventh data stream at the second data rate.

The seventh data stream output by the multi-rate deinterleaver circuitry 152 at the second data rate includes interleaved data for a plurality of eighth data streams (e.g., data streams to be transmitted via the plurality of ports 112 of the multi-port transceiver 104), each at the first data rate, according to an embodiment. Accordingly, the multi-rate deinterleaver circuitry 152 is configured to deinterleave the fifth data stream, received at the third data rate, into i) the plurality of sixth data streams, each output at the first data rate, and ii) the seventh data stream output at the second data rate, where the seventh data stream is an interleaving of the plurality of eighth data streams, each at the first data rate. When the number of data streams in the plurality of sixth data streams is M and the number of data streams in the plurality of eighth data streams is N, the third data rate is N+M times the first data rate, according to an embodiment.

Figure 2A:
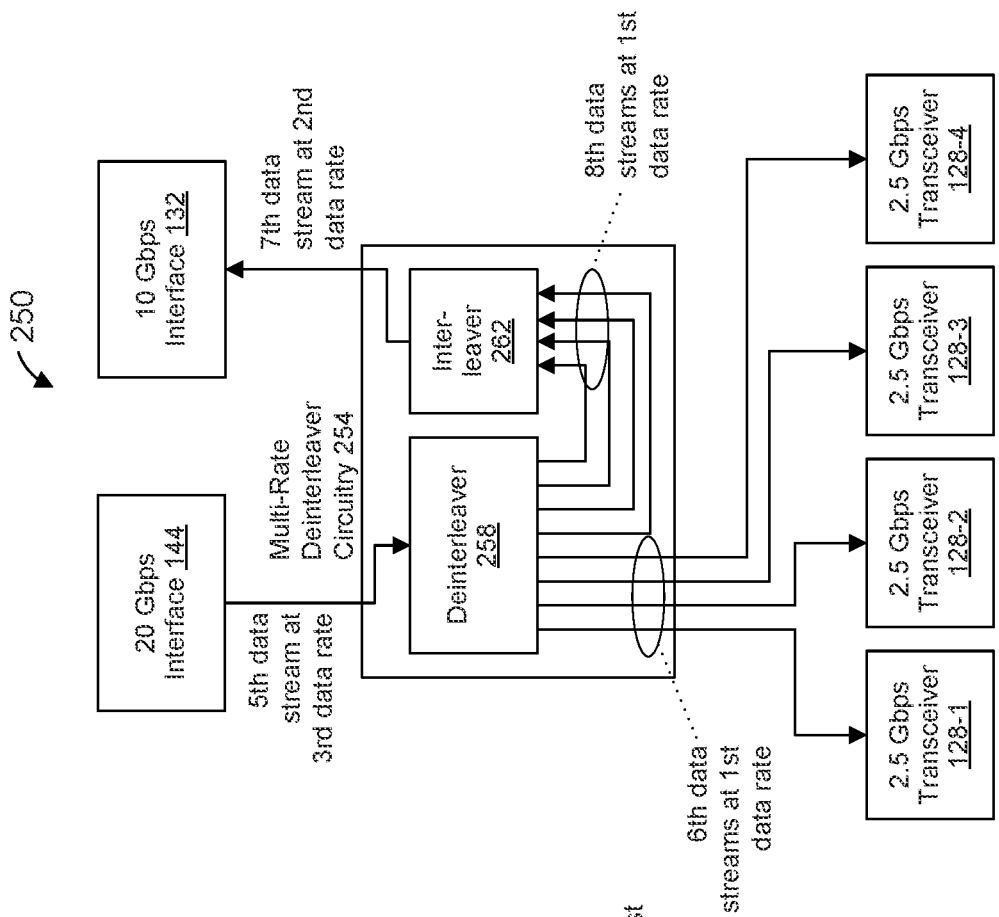
FIG. 2A is a simplified block diagram of example multi-rate interleaver circuitry used in the example multi-port transceiver system of FIG. 1, according to an embodiment.

FIG. 2A is a simplified block diagram of example multi-rate interleaver circuitry 204, according to an embodiment. Referring to FIG. 1, the multi-rate interleaver circuitry 148 includes the interleaver circuitry 204, in an embodiment, and FIG. 2A is described with reference to FIG. 1 for ease of explanation. In other embodiments, the multi-rate interleaver circuitry 148 of FIG. 1 includes other suitable multi-rate interleaver circuitry different than the multi-rate interleaver circuitry 204, and/or the multi-rate interleaver circuitry 204 is utilized in a suitable transceiver different than the example multi-port transceiver 108 of FIG. 1.

The multi-rate interleaver circuitry 204 is configured to receive i) the plurality of first data streams (e.g., data streams from the plurality of ports 128 of the multi-port transceiver 108) each at the first data rate, and ii) the second data stream (e.g., data from the multi-port transceiver 104) at the second data rate that is higher than the first data rate. In an embodiment, the second data rate is N times the first data rate. The multi-rate interleaver circuitry 204 is further configured to interleave i) the plurality of first data streams, each received at the first data rate, and ii) the second data stream at the second data rate, to generate the third data stream at the third data rate. In an embodiment, the third data rate is N+M times the first data rate.

The second data stream received by the multi-rate interleaver circuitry 204 at the second data rate includes interleaved data from a plurality of fourth data streams (e.g., data streams from the plurality of ports 112 of the multi-port transceiver 104), each at the first data rate, according to an embodiment. Accordingly, the multi-rate interleaver circuitry 204 is configured to interleave i) the plurality of first data streams, each received at the first data rate, and ii) the second data stream, which is an interleaving of the plurality of fourth data streams, each at the first data rate. When the number of data streams in the plurality of first data streams is M and the number of data streams in the plurality of fourth data streams is N, the third data rate is N+M times the first data rate, according to an embodiment.

The multi-rate interleaver circuitry 204 includes a deinterleaver 208 that is configured to receive the second data stream at the second data rate, which includes interleaved data from the plurality of fourth data streams (e.g., data streams from the plurality of ports 112 of the multi-port transceiver 104), each at the first data rate. The deinterleaver 208 is configured to deinterleave the second data stream into the plurality of fourth data streams, each at the first data rate. In an embodiment, the deinterleaver 208 is configured to deinterleave fixed-length segments of data from the second data stream into the plurality of fourth data streams in a round-robin manner.

The multi-rate interleaver circuitry 204 also includes an interleaver 212. The interleaver 212 is configured to receive i) the plurality of first data streams (e.g., data streams from the plurality of ports 128 of the multi-port transceiver 108), each received at the first data rate, and ii) the plurality of fourth data streams from the deinterleaver 208, each at the first data rate. The interleaver 212 is further configured to interleave i) the plurality of first data, and ii) the plurality of fourth data streams, to generate the third data stream at the third data rate. In an embodiment, the interleaver 212 is configured to interleave fixed-length segments of data from the plurality of first data streams and the plurality of fourth data streams into the third data stream in a round-robin manner.

In some embodiments, first data streams from the transceivers 128 include respective port identifiers (IDs) that indicate the respective transceivers 128 from which the first data streams were received. In an illustrative embodiment in which the second multi-port transceiver 108 includes four transceivers 128, port ID 0 corresponds to transceiver 128-1, port ID 1 corresponds to transceiver 128-2, port ID 2 corresponds to transceiver 128-3, port ID 3 corresponds to transceiver 128-4.

Similarly, the interleaved fourth data streams in the second data stream from the interface 132 include respective port IDs that indicate the respective transceivers 112 from which the fourth data streams were received. In an illustrative embodiment in which the first multi-port transceiver 104 includes four transceivers 112, port ID 0 corresponds to transceiver 112-1, port ID 1 corresponds to transceiver 112-2, port ID 2 corresponds to transceiver 112-3, port ID 3 corresponds to transceiver 112-4.

Referring again to FIG. 1, in some embodiments the ingress circuitry 136 includes port ID remapping circuitry 160 that is configured to modify port IDs that were included in the data stream from the interface 132. For example, when the data streams from the transceivers 128 include port IDs from a first set of port ID values (e.g., 0, 1, 2, 3), the port ID remapping circuitry 160 remaps port IDs that were included in the data stream from the interface 132 to values selected from a second set of port ID values (e.g., 4, 5, 6, 7) that does not include any values from the first set of port ID values. As an illustrative example, port ID 0 is remapped to port ID 4, port ID 1 is remapped to port ID 5, port ID 2 is remapped to port ID 6, and port ID 3 is remapped to port ID 7. In other embodiments, the port ID remapping circuitry 160 performs another suitable remapping of port IDs.

Figure 2B:
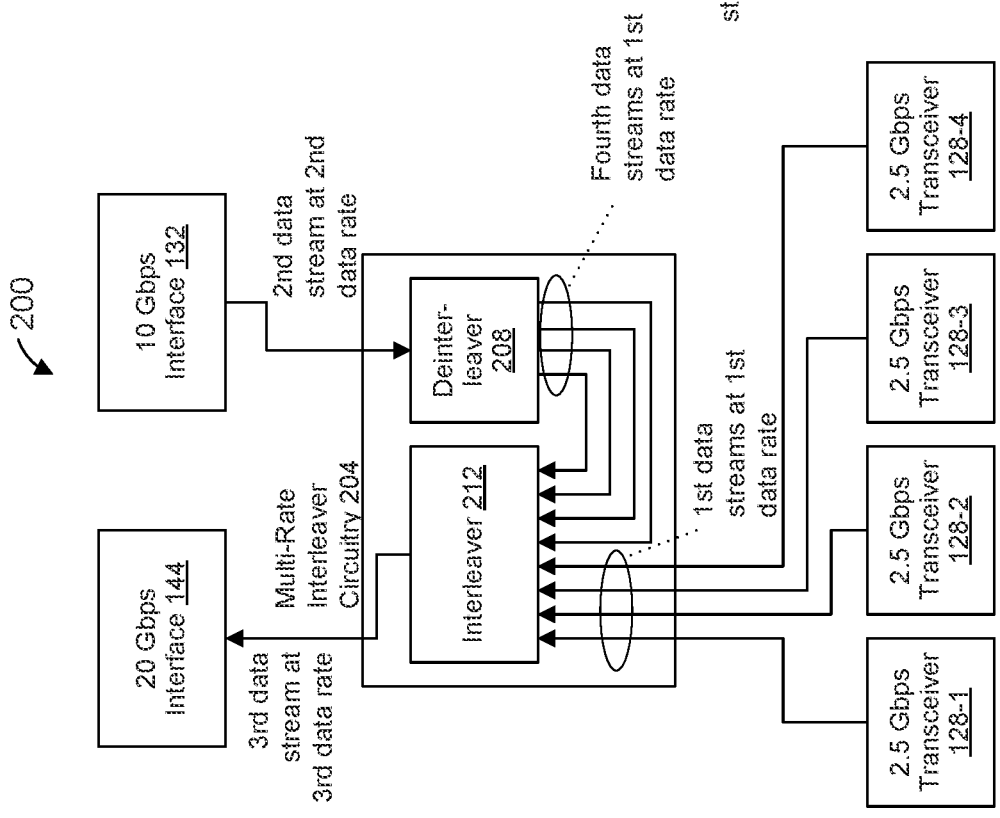
FIG. 2B is a simplified block diagram of example multi-rate deinterleaver circuitry used in the example multi-port transceiver system of FIG. 1, according to an embodiment.

FIG. 2B is a simplified block diagram of example multi-rate deinterleaver circuitry 254, according to an embodiment. Referring to FIG. 1, the multi-rate deinterleaver circuitry 152 includes the multi-rate deinterleaver circuitry 254, in an embodiment, and FIG. 2B is described with reference to FIG. 1 for ease of explanation. In other embodiments, the multi-rate deinterleaver circuitry 152 of FIG. 1 includes other suitable multi-rate deinterleaver circuitry different than the multi-rate deinterleaver circuitry 254, and/or the multi-rate deinterleaver circuitry 254 is utilized in a suitable transceiver different than the example multi-port transceiver 108 of FIG. 1.

The multi-rate deinterleaver circuitry 254 is configured to receive the fifth data stream received from the interface 144 at the third data rate. The multi-rate deinterleaver circuitry 254 is further configured to deinterleave the fifth data stream into i) the plurality of sixth data streams, each at the first data rate, and ii) the seventh data stream at the second data rate.

The seventh data stream output by the multi-rate deinterleaver circuitry 254 at the second data rate includes interleaved data for the plurality of eighth data streams (e.g., data streams to be transmitted via the plurality of ports 112 of the multi-port transceiver 104), each at the first data rate, according to an embodiment. Accordingly, the multi-rate deinterleaver circuitry 254 is configured to deinterleave the fifth data stream, received at the third data rate, into i) the plurality of sixth data streams, each output at the first data rate, and ii) the seventh data stream output at the second data rate, where the seventh data stream is an interleaving of the plurality of eighth data streams, each at the first data rate. When the number of data streams in the plurality of sixth data streams is M and the number of data streams in the plurality of eighth data streams is N, the third data rate is N-M Pines the first data rate, according to an embodiment.

The multi-rate deinterleaver circuitry 254 includes a deinterleaver 258 that is configured to receive the fifth data stream at the third data rate, and deinterleave the fifth data stream into the plurality of sixth data streams and the plurality of eighth data streams, each at the first data rate. In an embodiment, the deinterleaver 258 is configured to deinterleave fixed-length segments of data from the fifth data stream into the plurality of sixth data streams and the plurality of eighth data streams in a round-robin manner.

The multi-rate deinterleaver circuitry 254 also includes an interleaver 262. The interleaver 262 is configured to receive the plurality of eighth data streams (e.g., data streams for the plurality of ports 112 of the multi-port transceiver 104), each received at the first data rate, and to interleave plurality of eighth data streams to generate the second data stream at the second data rate. In an embodiment, the interleaver 262 is configured to interleave fixed-length segments of data from the plurality of eighth data streams into the seventh data stream in a round-robin manner.

In some embodiments, the fifth data stream includes respective port IDs that indicate the respective transceivers, from the set of N+M transceivers 112, 128, to which respective data is to be sent. In an illustrative embodiment in which the second multi-port transceiver 108 includes four transceivers 128 and the first multi-port transceiver 104 includes four transceivers 112, port ID 0 corresponds to transceiver 128-1, port ID 1 corresponds to transceiver 128-2, port ID 2 corresponds to transceiver 128-3, port ID 3 corresponds to transceiver 128-4, port ID 4 corresponds to transceiver 112-1, port ID 5 corresponds to transceiver 112-2, port ID 6 corresponds to transceiver 112-3, and port ID 7 corresponds to transceiver 112-4.

Referring again to FIG. 1, in some embodiments the egress circuitry 140 includes port ID remapping circuitry 164 that is configured to modify port IDs that were in the data stream from the interface 132. For example, the port ID remapping circuitry 164 remaps port IDs in the data stream from the interface 132 from values in the second set of port ID values (e.g., 4, 5, 6, 7) to values in the first set of port ID values (e.g., 0, 1, 2, 3). As an illustrative example, port ID 4 is remapped to port ID 0, port ID 5 is remapped to port ID 1, port ID 6 is remapped to port ID 2, and port ID 7 is remapped to port ID 3. In other embodiments, the port ID remapping circuitry 164 performs another suitable remapping of port IDs.

Figure 3:
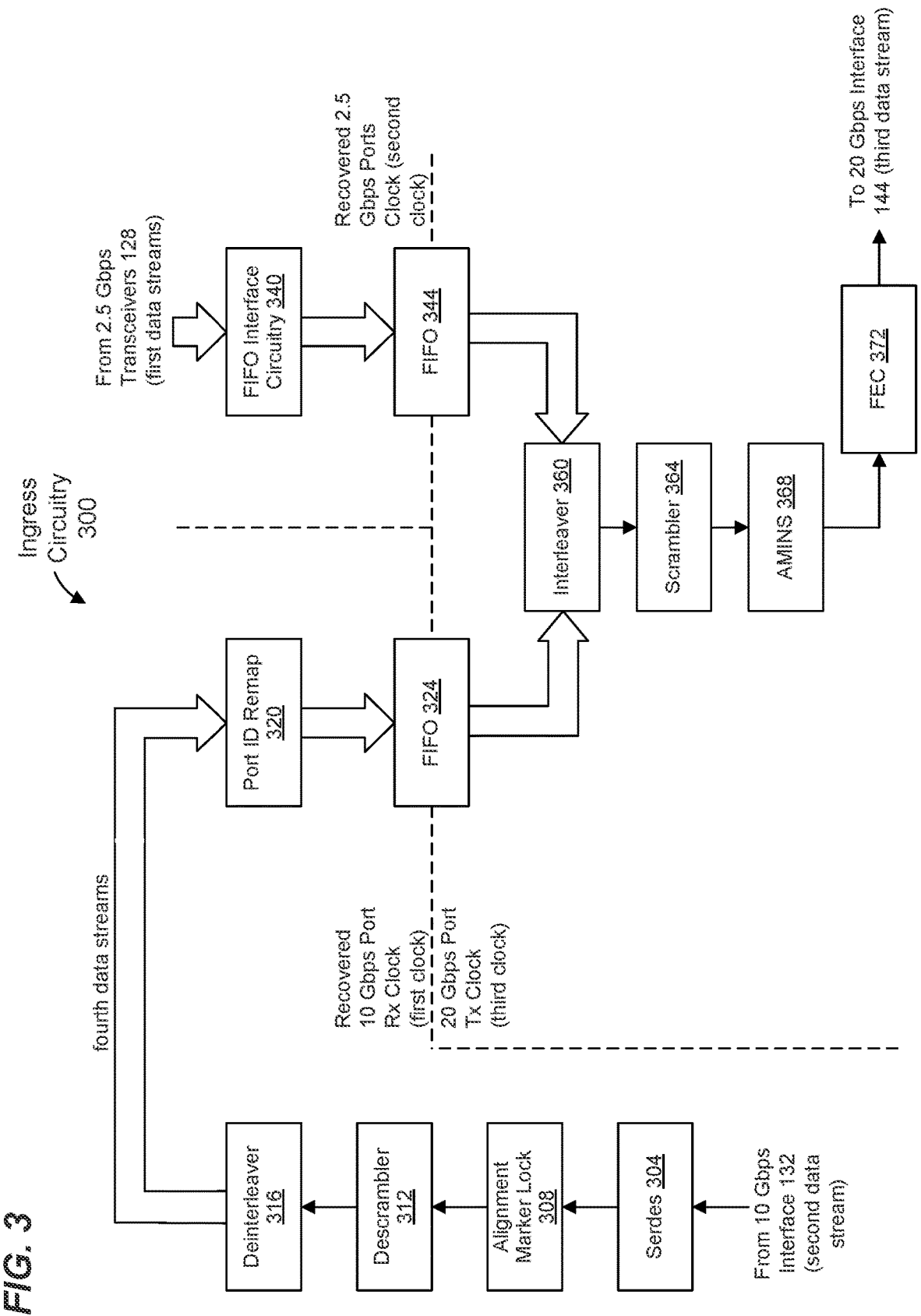
FIG. 3 is a simplified block diagram of example ingress circuitry for a multi-port transceiver, according to an embodiment.

FIG. 3 is a simplified block diagram of example ingress circuitry 300 for a multi-port transceiver, according to an embodiment. Referring to FIG. 1, the ingress circuitry 136 includes the ingress circuitry 300, in an embodiment, and FIG. 3 is described with reference to FIGS. 1 and 2A for ease of explanation. In other embodiments, the ingress circuitry 136 of FIG. 1 includes other suitable circuitry different than the ingress circuitry 300, and/or the ingress circuitry 300 is utilized in a suitable transceiver different than the example multi-port transceiver 108 of FIG. 1 and/or the multi-rate interleaver circuitry 204 of FIG. 2A.

A SERDES 304 receives a 10 Gbps data stream (second data stream) from the first multi-port transceiver 104, which includes four interleaved data streams (fourth data streams) from the transceivers 112 of the first multi-port transceiver 104. In some embodiments, the SERDES 304 is a component of the interface 132. Synchronization circuitry 308 locks to alignment markers in the second data stream, and a descrambler 312 descrambles data in the second data stream.

A deinterleaver 316 deinterleaves the second data stream into the fourth data streams. The deinterleaver 316 is configured to use alignment markers in the second data stream to identify respective data blocks corresponding to respective fourth data streams, and to deinterleave the respective data blocks into the fourth data streams in a round-robin manner.

In an embodiment, the deinterleaver 316 includes the deinterleaver 208 of FIG. 2A. In another embodiment, the deinterleaver 316 includes another suitable deinterleaver different than the deinterleaver 208.

Port ID remapping circuitry 320 modifies port IDs that were included in the second data stream from the interface 132. For example, the fourth data streams output by the deinterleaver 316 include port IDs from a first set of port ID values (e.g., 0, 1, 2, 3), and the port ID remapping circuitry 320 remaps the port IDs in the fourth data streams to values selected from a second set of port ID values (e.g., 4, 5, 6, 7). As an illustrative example, port ID 0 is remapped to port ID 4, port ID 1 is remapped to port ID 5, port ID 2 is remapped to port ID 6, and port ID 3 is remapped to port ID 7. In other embodiments, the port ID remapping circuitry 320 performs another suitable remapping of port IDs in the fourth data streams.

In an embodiment, the port ID remapping circuitry 160 of FIG. 1 includes the port ID remapping circuitry 320. In another embodiment, the port ID remapping circuitry 160 of FIG. 1 includes other suitable circuitry different than the port ID remapping circuitry 320.

After port ID remapping, the deinterleaved data from the fourth data streams is stored in a first-in-first-out buffer (FIFO) 324.

The SERDES 304, the synchronization circuitry 308, the descrambler 312, the deinterleaver 316, and the port ID remapping circuitry 320 are clocked based on a first clock recovered from the data stream received at the interface 132. Additionally, data is added to the FIFO 324 based on the first clock.

FIFO interface circuitry 340 receives a plurality of data streams (first data streams) from the transceivers 128, each at the first clock rate (e.g., 2.5 Gbps). The FIFO interface circuitry 340 stores data from the first data streams in a FIFO 344.

FIFO interface circuitry 340 is clocked based on a second clock generated based the first data streams received from the 2.5 Gbps ports 128. Additionally, data is added to the FIFO 344 based on the second clock.

Data is output from the FIFO 324 and the FIFO 344 based on a third clock used for transmitting via the interface 144. In an embodiment, the first clock and the third clock are generated from a same clock oscillator and thus are synchronized in frequency. However, the first clock may be out of phase from the third clock. The FIFO 324 facilitates transitioning data streams from the first clock to the third clock. Similarly, the second clock and the third clock are unsynchronized. The FIFO 344 facilitates transitioning data streams from the second clock to the third clock.

The second clock is also unsynchronized with the first clock. The use of separate FIFOs 324, 344 permits transitioning data streams from two different clocks (the first clock and the second clock) to the third clock.

An interleaver 360 receives data from the FIFO 324 (fourth data streams) and data from the FIFO 344 (first data streams), and interleaves the data from the FIFOs 324, 344 into a single third data stream. The interleaver 360 interleaves data blocks from the FIFOs 324, 344 into the single third data stream in a round-robin manner, according to an embodiment.

In an embodiment, the interleaver 360 includes the interleaver 212 of FIG. 2A. In another embodiment, the interleaver 360 includes another suitable interleaver different than the interleaver 212.

The deinterleaver 316 and the interleaver 360 are components of multi-rate interleaver circuitry such as the multi-rate interleaver circuitry 148 (FIG. 1), the multi-rate interleaver circuitry 204 (FIG. 2A), or other suitable multi-rate interleaver circuitry, according to some embodiments.

A scrambler 364 scrambles data in the third data stream and alignment marker insertion circuitry 368 adds alignment markers to the third data stream to facilitate subsequent deinterleaving of the different data streams in the third data stream. In some embodiments, the ingress circuitry 300 includes a forward error correction code encoder 372, such as a Reed-Solomon encoder or another suitable type of forward error correction code encoder. In some embodiments, the forward error correction code encoder 372 is omitted.

The interleaver 360, the scrambler 364, and the alignment marker insertion circuitry 368 are clocked based on the third clock.

Figure 4:
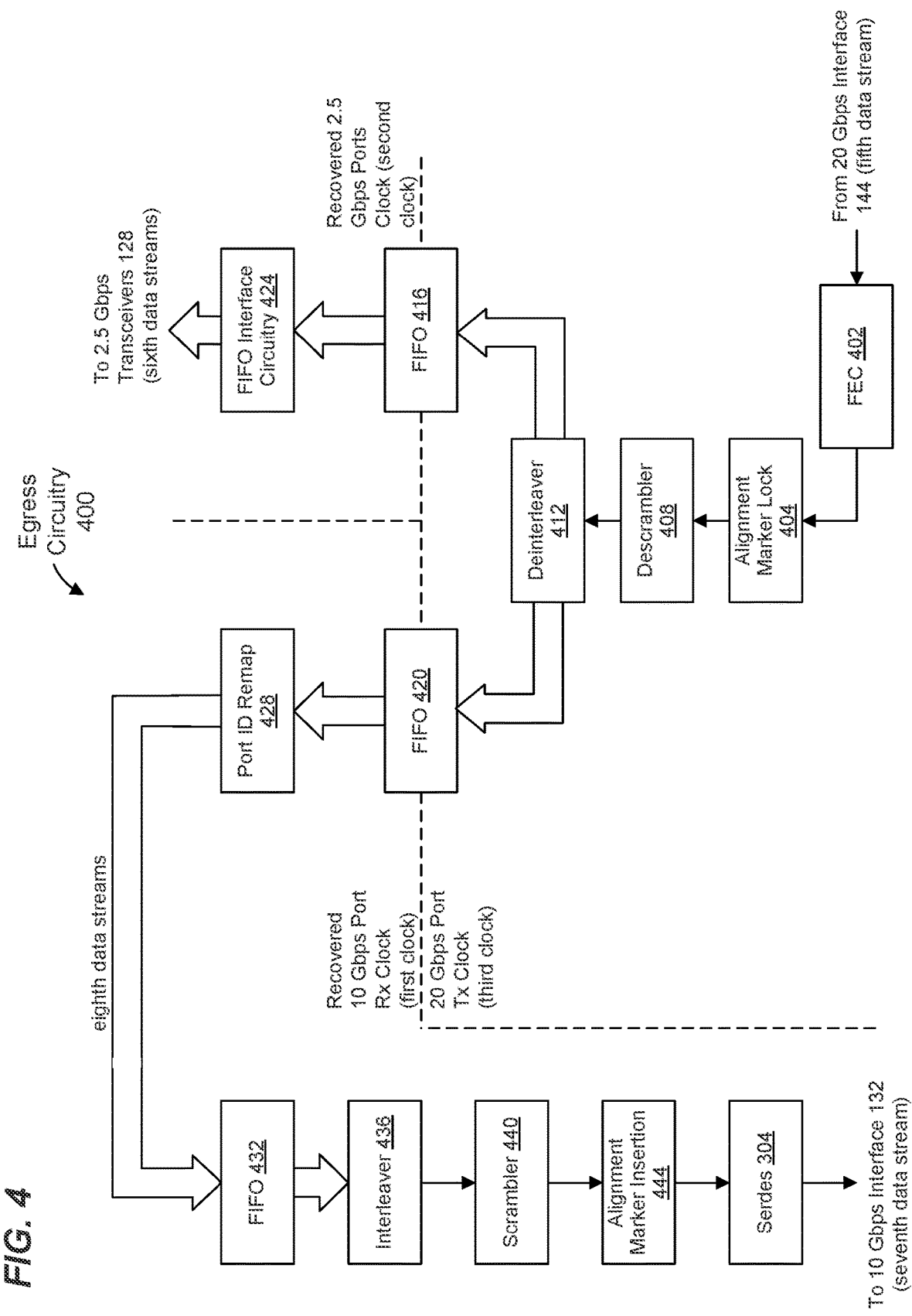
FIG. 4 is a simplified block diagram of example egress circuitry for a multi-port transceiver, according to an embodiment.

FIG. 4 is a simplified block diagram of example egress circuitry 400 for a multi-port transceiver, according to an embodiment. Referring to FIG. 1, the egress circuitry 140 includes the egress circuitry 400, in an embodiment, and FIG. 4 is described with reference to FIGS. 1 and 2B for ease of explanation. In other embodiments, the egress circuitry 140 of FIG. 1 includes other suitable circuitry different than the egress circuitry 400, and/or the egress circuitry 400 is utilized in a suitable transceiver different than the example multi-port transceiver 108 of FIG. 1 and/or the multi-rate deinterleaver circuitry 254 of FIG. 2B.

In some embodiments, the egress circuitry 400 includes a forward error correction code decoder 402, such as a Reed-Solomon decoder or another suitable type of forward error correction code decoder. In some embodiments, the forward error correction code decoder 402 is omitted. When included, the forward error correction code decoder 402 performs forward error correction code decoding on data in the fifth data stream.

Synchronization circuitry 404 locks to alignment markers in the fifth data stream, and a descrambler 408 descrambles data in the fifth data stream.

A deinterleaver 412 is configured to use alignment markers in the fifth data stream to identify respective data blocks corresponding to respective sixth and eighth data streams, and to deinterleave the respective data blocks into the respective sixth and eighth data streams in a round-robin manner.

In an embodiment, the deinterleaver 412 includes the deinterleaver 258 of FIG. 2B. In another embodiment, the deinterleaver 412 includes another suitable deinterleaver different than the deinterleaver 258.

Deinterleaved data corresponding to the sixth data streams are stored in a FIFO 416, and deinterleaved data corresponding to the eighth data streams are stored in a FIFO 420.

The synchronization circuitry 404, the descrambler 408, and the deinterleaver 412 are clocked based on the third clock. Additionally, data is added to the FIFO 416 and to the FIFO 420 based on the third clock.

FIFO interface circuitry 424 retrieves a plurality of data streams (the sixth data streams) from the FIFO 416 and provides the plurality of data streams to the transceivers 128, each at the first clock rate (e.g., 2.5 Gbps).

The FIFO interface circuitry 424 is clocked based on the second clock, which is generated based the first data streams received from the 2.5 Gbps ports 128. Additionally, data is retrieved from the FIFO 416 based on the second clock.

As discussed above, the second clock and the third clock are unsynchronized. The FIFO 416 facilitates transitioning data streams from the third clock to the second clock.

Data from the eighth data streams are retrieved from the FIFO 420 using the first clock and provided to port ID remapping circuitry 428. The port ID remapping circuitry 428 modifies port IDs that were included in the fifth data stream from the interface 144. For example, the data streams output from the FIFO 420 include port IDs from the second set of port ID values (e.g., 4, 5, 6, 7), and the port ID remapping circuitry 428 remaps the port ID values from the second set to the first set of port ID values (e.g., 0, 1, 2, 3). As an illustrative example, port ID 4 is remapped to port ID 0, port ID 5 is remapped to port ID 1, port ID 6 is remapped to port ID 2, and port ID 7 is remapped to port ID 3. In other embodiments, the port ID remapping circuitry 428 performs another suitable remapping of port IDs in the eighth data streams.

In an embodiment, the port ID remapping circuitry 164 of FIG. 1 includes the port ID remapping circuitry 428. In another embodiment, the port ID remapping circuitry 164 of FIG. 1 includes other suitable circuitry different than the port ID remapping circuitry 428.

The port ID remapping circuitry 428 is clocked based on the first clock recovered from the data stream received at the interface 132. Additionally, data is retrieved from the FIFO 420 based on the first clock.

As discussed above, the first clock and the third clock are synchronized in frequency, but the first clock may be out of phase from the third clock. The FIFO 420 facilitates transitioning data streams from the third clock to the first clock.

The first clock is also unsynchronized with the second clock. The use of separate FIFOs 416, 420 permits transitioning data streams from the third clock to two different clocks (the first clock and the second clock).

The eighth data streams output by the port ID remapping circuitry 428 are stored in a FIFO 432. An interleaver 436 receives data from the FIFO 432 (eighth data streams) and interleaves the data from the FIFO 432 into the single seventh data stream. The interleaver 432 interleaves data blocks from the FIFO 432 into the single seventh data stream in a round-robin manner, according to an embodiment.

In an embodiment, the interleaver 436 includes the interleaver 262 of FIG. 2B, In another embodiment, the interleaver 436 includes another suitable interleaver different than the interleaver 262.

The deinterleaver 412 and the interleaver 436 are components of multi-rate deinterleaver circuitry such as the multi-rate deinterleaver circuitry 152 (FIG. 1), the multi-rate deinterleaver circuitry 254 (FIG. 2B), or other suitable multi-rate deinterleaver circuitry, according to some embodiments.

A scrambler 440 scrambles data in the seventh data stream and alignment marker insertion circuitry 444 adds alignment markers to the seventh data stream to facilitate subsequent deinterleaving of the different eighth data streams within the seventh data stream.

The FIFO 432, the interleaver 436, the scrambler 440, and the alignment marker insertion circuitry 444 are clocked based on the first clock.

Figure 5:
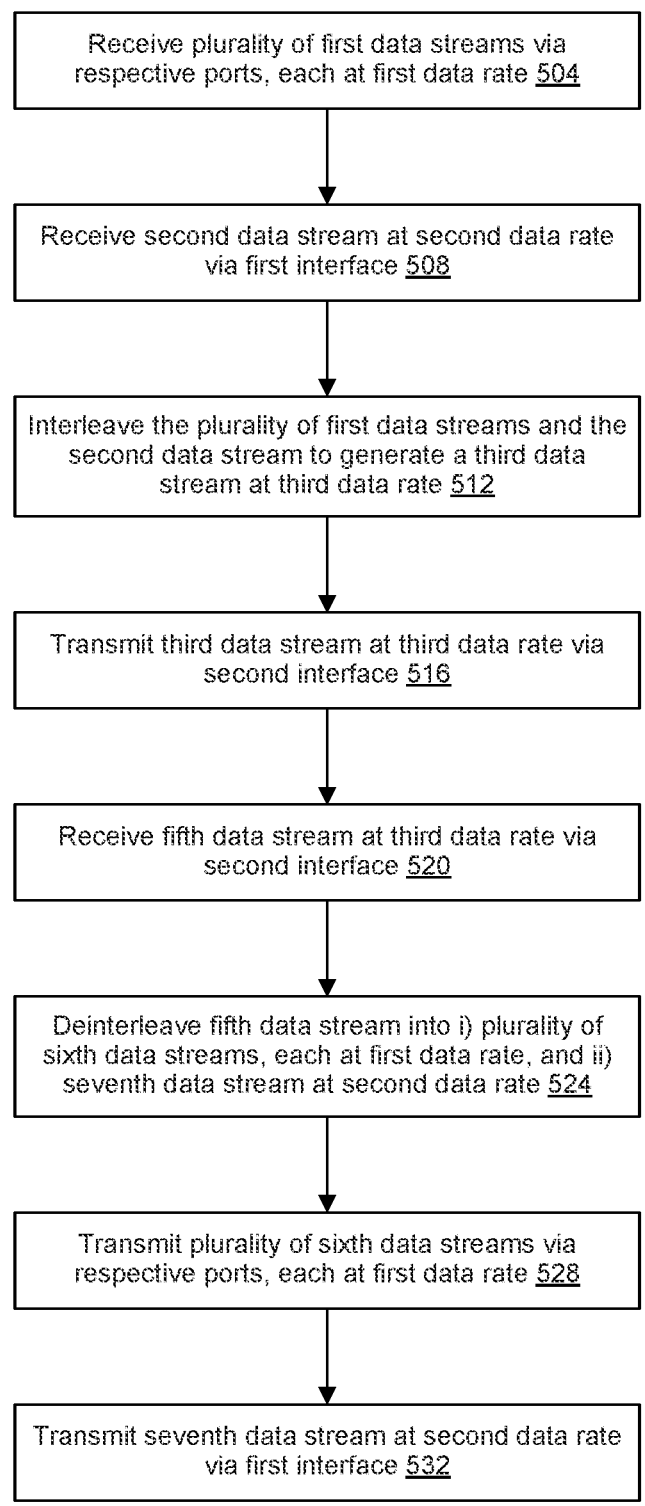
FIG. 5 is a flow diagram of an example method for operating a multi-port transceiver, according to an embodiment.

FIG. 5 is a flow diagram of an example method 500 for operating a multi-port transceiver, according to an embodiment. In some embodiments, the example multi-port transceiver 108 (FIG. 1) implements the method 500. In some embodiments, the method 500 is implemented using the multi-rate interleaver circuitry 204 (FIG. 2A) and/or the multi-rate deinterleaver circuitry 254 (FIG. 2B). In some embodiments, the method 500 is implemented using the ingress circuitry 300 (FIG. 3) and/or the egress circuitry 400 (FIG. 4). The method 500 is discussed with reference to FIGS. 1-4 merely for explanatory purposes. In other embodiments, the method 500 is implemented by/using other suitable multi-port transceivers and/or circuitry different than the multi-port transceiver and circuitry of FIGS. 1-4.

At block 504, a plurality of first data streams is received via respective ports of the multi-port transceiver. In an embodiment, each first data stream is received via the respective port at a first data rate. For example, first data streams are received via respective transceivers 128 (FIGS. 1, 2A, 2B) at the first data rate.

At block 508, a second data stream is received at a first communication interface of the multi-port transceiver. In an embodiment, the second data stream is received at the first communication interface at a second data rate that is higher than the first data rate. For example, the second data stream is received via the interface 132 (FIGS. 1, 2A, 2B). In an embodiment, the second data rate is M times the first data rate, where M is a suitable positive integer greater than one.

At block 512, interleaver circuitry interleaves the plurality of first data streams and the second data stream to generate a third data stream. In an embodiment, the third data stream corresponds to a third data rate that is higher than the second data rate. In an embodiment in which N first data streams are received at block 504, where N is a suitable positive integer greater than one, and in which the second data stream is received at block 508 at M times the first data rate, the third data rate is at least N+M times the first data rate.

For example, the interleaver circuitry 148 (FIG. 1) interleaves the plurality of first data streams and the second data stream to generate the third data stream. As another example, the interleaver circuitry 204 (FIG. 2A) interleaves the plurality of first data streams and the second data stream to generate the third data stream.

In some embodiments, interleaving the plurality of first data streams and the second data stream comprises: deinterleaving the second data stream into a plurality of fourth data streams; and interleaving the plurality of first data streams and the plurality of fourth data streams to generate the third data stream. For example, the deinterleaver 208 (FIG. 2A) deinterleaves the second data stream into the plurality of fourth data streams, and the interleaver 212 (FIG. 2A) interleaves the plurality of first data streams and the plurality of fourth data streams to generate the third data stream. As another example, the deinterleaver 316 (FIG. 3) deinterleaves the second data stream into the plurality of fourth data streams, and the interleaver 360 (FIG. 3) interleaves the plurality of first data streams and the plurality of fourth data streams to generate the third data stream.

At block 516, the third data stream generated at block 512 is transmitted via a second communication interface. In an embodiment, the third data stream is transmitted via the second communication interface at the third data rate. For example, the third data stream is transmitted via the interface 144 (FIGS. 1, 2A, 2B).

At block 520, a fifth data stream is received via the second communication interface. In an embodiment, the fifth data stream is received via the second communication interface at the third data rate. For example, the fifth data stream is received via the interface 144 (FIGS. 1, 2A, 2B).

At block 524, multi-rate deinterleaver circuitry deinterleaves the fifth data stream into a plurality of sixth data streams and a seventh data stream. In an embodiment, the fifth data stream corresponds to the third data rate; the plurality of sixth data streams correspond to the first data rate, and the seventh data stream corresponds to the second data rate. For example, the multi-rate deinterleaver circuitry 152 (FIG. 1) deinterleaves the fifth data stream into the plurality of sixth data streams and the seventh data stream. As another example, the multi-rate deinterleaver circuitry 254 (FIG. 2B) deinterleaves the fifth data stream into the plurality of sixth data streams and the seventh data stream.

In some embodiments, deinterleaving the fifth data stream into the plurality of sixth data streams and the seventh data stream comprises: deinterleaving the fifth data stream into the plurality of sixth data streams and a plurality of eighth data streams; and interleaving the plurality of plurality of eighth data streams to generate the seventh data stream. For example, the deinterleaver 258 (FIG. 2B) deinterleaves the fifth data stream into the plurality of sixth data streams and the plurality of eighth data streams; and the interleaver 222 (FIG. 2B) interleaves the plurality of eighth data streams to generate the seventh data stream. As another example, the deinterleaver 412 (FIG. 4) deinterleaves the fifth data stream into the plurality of sixth data streams and the plurality of eighth data streams; and the interleaver 436 (FIG. 4) interleaves the plurality of eighth data streams to generate the seventh data stream.

At block 528, the plurality of sixth data streams is transmitted via respective ports of the multi-port transceiver. In an embodiment, each sixth data stream is transmitted via the respective port at the first data rate. For example, the transceivers 128 (FIGS. 1, 2A, 2B) transmit respective sixth data streams at the first data rate.

At block 532, the seventh data stream is transmitted via the first communication interface of the multi-port transceiver. In an embodiment, the seventh data stream is transmitted via the first communication interface at the second data rate that is higher than the first data rate. For example, the seventh data stream is transmitted via the interface 132 (FIGS. 1, 2A, 2B).

Although embodiments were discussed above in which a multi-port transceiver (e.g., the multi-port transceiver 108) transmits and receives interleaved data to/from one other multi-port transceiver (e.g., the multi-port transceiver 104), in other embodiments, a multi-port transceiver similar to the example multi-port transceivers discussed above transmits and receives interleaved data to/from multiple other multi-port transceivers in a similar manner.

Figure 6:
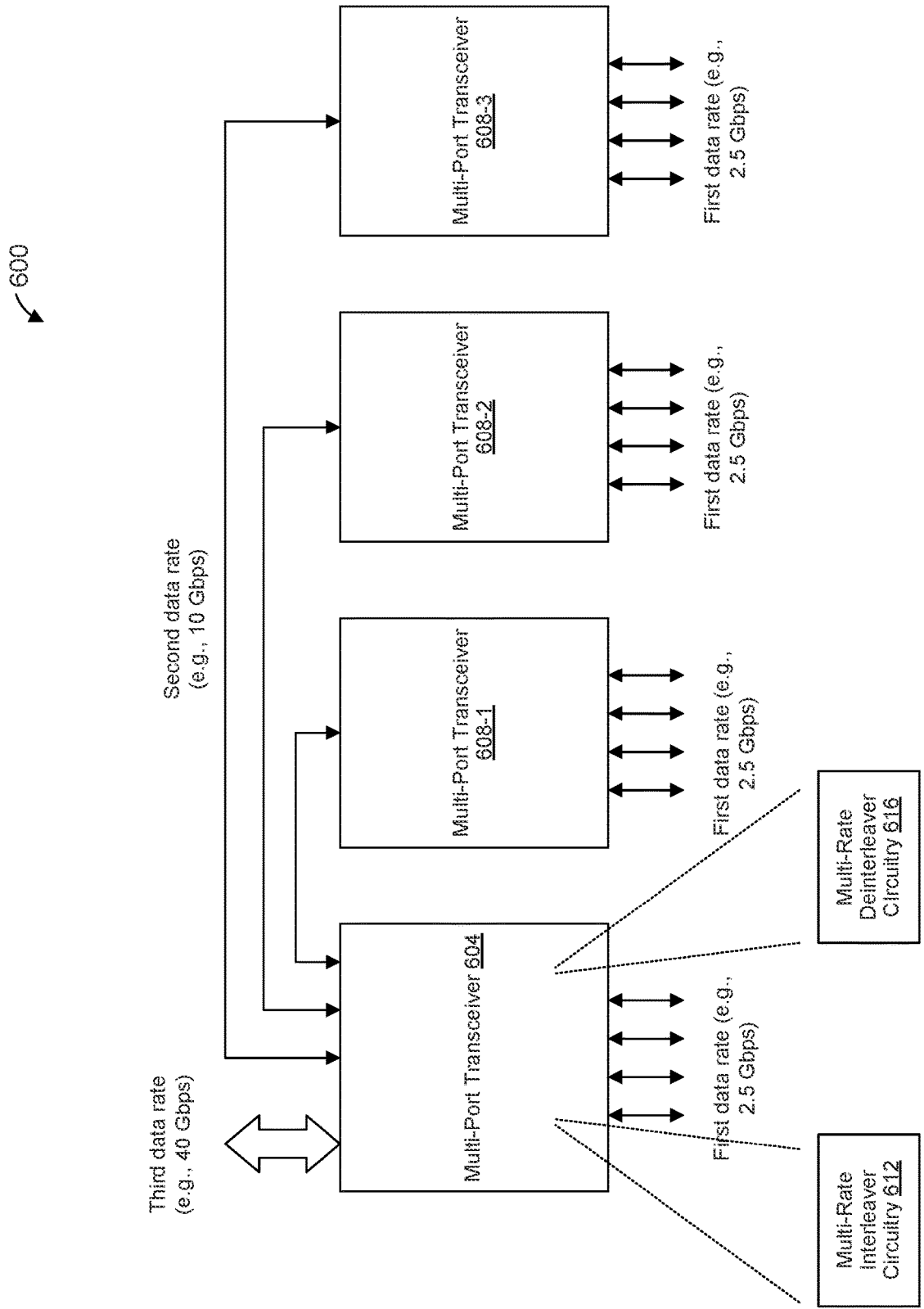
FIG. 6 is a simplified block diagram of another example multi-port transceiver system in which a first multi-port transceiver is cascaded with multiple second multi-port transceivers, according to another embodiment.

FIG. 6 is a simplified block diagram of an example multi-port transceiver system 600 in which a first multi-port transceiver 604 is cascaded with three second multi-port transceivers 608, according to an embodiment. Each second multi-port transceiver 608 is the same as or similar to the multi-port transceiver 104 of FIG. 1.

The first multi-port transceiver 604 is similar to the multi-port transceiver 108 of FIG. 1, but is capable of transmitting and receiving interleaved data to/from the three multi-port transceivers 608 via three communication interfaces (not shown), each the same as or similar to the communication interface 132 (FIG. 1) at the second data rate (e.g., 10 Gbps). Additionally, the first multi-port transceiver 604 includes a communication interface (not shown), similar to the communication interface 144 (FIG. 1), but capable of transmitting and receiving at a third data rate of at least four times the second data rate (e.g., 41.25 Gbps, sometimes referred to as 40 Gbps). The first multi-port transceiver 604 further includes four transceivers (not shown), similar to or the same as the transceivers 128, capable of transmitting and receiving at the first date rate (e.g., 2.5 Gbps).

The multi-port transceiver 604 includes multi-rate interleaver circuitry 612 similar to the multi-rate interleaver circuitry 148 (FIG. 1) but that is configured to receive i) M first data streams each at the first data rate, and ii) a plurality of second data streams, each at the second data rate that is higher than the first data rate. In an embodiment, the second data rate is N times the first data rate. The multi-rate interleaver circuitry 612 is further configured to interleave i) the plurality of first data streams, each received at the first data rate, and ii) the plurality of second data stream, each at the second data rate, to generate a third data stream at the third data rate. In an embodiment, the third data rate is 3*N+M times the first data rate. In an embodiment, in which the first data rate is 2.5 Gbps, the second data rate is 10 Gbps, and the third data rate is 40 Gbps. In some embodiments, the multi-rate interleaver circuitry 612 uses techniques such as described above to interleave the first data streams, each at the first data rate, and the plurality of second data streams, each at the second data rate that is higher than the first data rate.

The multi-port transceiver 604 also includes multi-rate deinterleaver circuitry 616 similar to the multi-rate deinterleaver circuitry 152 (FIG. 1) but that is configured to receive a fifth data stream at the third data rate, and deinterleave the fifth data stream into i) M sixth data streams, each at the first data rate, and ii) a plurality of seventh data streams, each at the second data rate. In an embodiment, the third data rate is 3*N+M times the first data rate. In an embodiment, in which the first data rate is 2.5 Gbps, the second data rate is 10 Gbps, and the third data rate is 40 Gbps. In some embodiments, the multi-rate deinterleaver circuitry 616 uses techniques such as described above to deinterleave the fifth data stream into i) M first data streams, each at the first data rate, and ii) the plurality of second data streams, each at the second data rate that is higher than the first data rate.

At least some of the various blocks, operations, and techniques described above may be implemented utilizing hardware, a processor executing firmware instructions, a processor executing software instructions, or any combination thereof.

When implemented using hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A first multi-port transceiver, comprising:
   a plurality of first ports that are configured to communicatively couple with a plurality of first communication cables, each first port configured to operate at a first data rate;
   a first communication interface that is configured to transmit and receive data at a second data rate higher than the first data rate;
   a second communication interface that is configured to transmit and receive data at a third data rate higher than the second data rate;
   multi-rate interleaver circuitry that is configured to interleave i) a plurality of first data streams, each received via a respective first port at the first data rate, and ii) a second data stream received via the first communication interface at the second data rate, to generate a third data stream to be transmitted via the second communication interface at the third data rate; and
   multi-rate deinterleaver circuitry that is configured to deinterleave a fourth data stream that was received via the second communication interface at the third data rate into i) a plurality of fifth data streams, each fifth data stream to be transmitted via a respective first port at the first data rate, and ii) a sixth data stream to be transmitted via the first communication interface at the second data rate.

2. The first multi-port transceiver of claim 1, wherein the second communication interface is configured to:
   communicatively couple to a second multi-port transceiver to i) receive the second data stream from the second multi-port transceiver, and ii) transmit the sixth data stream to the second multi-port transceiver.

3. The first multi-port transceiver of claim 1, wherein:
   the second data stream received via the first communication interface corresponds to an interleaving of a plurality of seventh data streams, each seventh data stream at the first data rate; and
   the sixth data stream to be transmitted via the first communication interface corresponds to an interleaving of a plurality of eighth data streams, each eighth data stream at the first data rate.

4. The first multi-port transceiver of claim 3, wherein:
   the multi-rate interleaver circuitry comprises i) a first deinterleaver configured to deinterleave the second data stream into the plurality of seventh data streams, and ii) a first interleaver configured to interleave the plurality of first data streams and the plurality of seventh data streams to generate the third data stream; and
   the multi-rate deinterleaver circuitry comprises i) a second deinterleaver configured to deinterleave the fourth data stream into the plurality of fifth data streams and the plurality of eighth data streams, and ii) a second interleaver configured to interleave the plurality of eighth data streams to generate the sixth data stream.

5. The first multi-port transceiver of claim 4, wherein:
   the first interleaver is configured to interleave respective fixed-length blocks of data from the plurality of first data streams and the plurality of seventh data streams into the third data stream in a round-robin manner; and
   the second deinterleaver is configured to deinterleave respective fixed-length blocks of data from the fourth data stream into the plurality of fifth data streams and the plurality of eighth data streams in a round-robin manner.

6. The first multi-port transceiver of claim 3, wherein:
   the plurality of first data streams includes respective first port identifiers that identify respective first ports of the first multi-port transceiver via which the plurality of first data streams were received, the first port identifiers selected from a first set of port identifiers;
   the plurality of seventh data streams interleaved in the second data stream include respective second port identifiers that identify respective second ports of a second multi-port transceiver via which the plurality of seventh data streams were received, the second port identifiers selected from a second set of port identifiers different than the first set of port identifiers; and
   the first multi-port transceiver further comprises port identifier remapping circuitry that is configured to change values of the second port identifiers in the plurality of seventh data streams to values selected from the second set of port identifiers.

7. The first multi-port transceiver of claim 6, wherein:
   the plurality of eighth data streams interleaved in the fourth data stream includes respective third port identifiers selected from the second set of port identifiers; and
   the port identifier remapping circuitry is further configured to change values of the third port identifiers in the plurality of eighth data streams to values selected from the first set of port identifiers.

8. The first multi-port transceiver of claim 1, wherein:
   the first communication interface is configured to transmit and receive data at M times the first data rate, wherein M is a positive integer greater than one;
   the multi-rate interleaver circuitry is configured to interleave i) N first data streams, wherein N is a positive integer greater than one, and ii) the second data stream received via the first communication interface, to generate a third data stream to be transmitted via the second communication interface at N+M times the first data rate; and
   the multi-rate deinterleaver circuitry is configured to deinterleave a fourth data stream that was received via the second communication interface into i) N fifth data streams, and ii) the sixth data stream.

9. The first multi-port transceiver of claim 1, wherein:
   each first port configured to operate at 2.5 gigabits per second (Gbps);

the first communication interface is configured to transmit and receive data at 10 Gbps;

the second communication interface is configured to transmit and receive data at 20 Gbps;

the multi-rate interleaver circuitry is configured to interleave i) the plurality of first data streams, each received at 2.5 Gbps, and ii) the second data stream received at 10 Gbps, to generate the third data stream to be transmitted via the second communication interface at 20 Gbps; and the multi-rate deinterleaver circuitry is configured to deinterleave the fourth data stream that was received at 20 Gbps into i) the plurality of fifth data streams, each fifth data stream to be transmitted at 2.5 Gbps, and ii) the sixth data stream to be transmitted at 10 Gbps.

10. A method for operating a first multi-port transceiver, the method comprising:

receiving a plurality of first data streams via respective first ports of the first multi-port transceiver, including receiving each first data stream at a first data rate;

receiving a second data stream via a first communication interface at a second data rate higher than the first data rate;

interleaving i) the plurality of first data streams, each received via a respective first port at the first data rate, and ii) the second data stream received at the second data rate, to generate a third data stream to be transmitted via a second communication interface at a third data rate higher than the second data rate;

transmitting the third data stream via the second communication interface at the third data rate;

receiving a fourth data stream via the second communication interface at the third data rate;

deinterleaving the fourth data stream into i) a plurality of fifth data streams, each fifth data stream to be transmitted via a respective first port at the first data rate, and ii) a sixth data stream to be transmitted via the first communication interface at the second data rate;

transmitting the plurality of fifth data streams via respective first ports of the first multi-port transceiver, including transmitting each fifth data stream at the first data rate; and transmitting the sixth data stream via the first communication interface at the second data rate.

11. The method of operating the first multi-port transceiver of claim 10, wherein:

receiving the second data stream via the first communication interface comprises receiving the second data stream from a second multi-port transceiver via the first communication interface; and transmitting the sixth data stream via the first communication interface comprises transmitting the sixth data stream to the second multi-port transceiver via the first communication interface.

12. The method of operating the first multi-port transceiver of claim 10, wherein:

receiving the second data stream comprises receiving the second data stream as an interleaving of a plurality of seventh data streams, each seventh data stream at the first data rate; and transmitting the sixth data stream via the first communication interface comprises transmitting the sixth data stream as an interleaving of a plurality of eighth data streams, each eighth data stream at the first data rate.

13. The method of operating the first multi-port transceiver of claim 12, wherein:

interleaving the plurality of first data streams and, the second data stream comprises i) deinterleaving the second data stream into the plurality of seventh data streams, and ii) interleaving the plurality of first data streams and the plurality of seventh data streams to generate the third data stream; and deinterleaving the fourth data stream into the plurality of fifth data streams and the sixth data stream comprises i) deinterleaving the fourth data stream into the plurality of fifth data streams and the plurality of eighth data streams, and ii) interleaving the plurality of eighth data streams to generate the sixth data stream.

14. The method of operating the first multi-port transceiver of claim 13, wherein:

interleaving the plurality of first data streams and the plurality of seventh data streams comprises interleaving respective fixed-length blocks of data from the plurality of first data streams and the plurality of seventh data streams into the third data stream in a round-robin manner; and deinterleaving the fourth data stream into the plurality of fifth data streams and the plurality of eighth data streams comprises deinterleaving respective fixed-length blocks of data from the fourth data stream into the plurality of fifth data streams and the plurality of eighth data streams in a round-robin manner.

15. The method of operating the first multi-port transceiver of claim 12, wherein:

receiving the plurality of first data stream comprises receiving respective first port identifiers, within respective first data streams, that identify respective first ports of the first multi-port transceiver via which the plurality of first data streams were received, the first port identifiers selected from a first set of port identifiers;

receiving the second data stream as the interleaving of the plurality of seventh data streams comprises receiving respective second port identifiers, within the plurality of seventh data streams, that identify respective second ports of a second multi-port transceiver via which the plurality of seventh data streams were received, the second port identifiers selected from a second set of port identifiers different than the first set of port identifiers; and the method further comprises modifying values of the second port identifiers in the plurality of seventh data streams to values selected from the second set of port identifiers.

16. The method of operating the first multi-port transceiver of claim 15, wherein:

receiving the plurality of eighth data streams interleaved in the fourth data stream includes receiving respective third port identifiers selected from the second set of port identifiers; and the method further comprises modifying values of the third port identifiers in the plurality of eighth data streams to values selected from the first set of port identifiers.

17. The method of operating the first multi-port transceiver of claim 10, wherein:

receiving the second data stream via the first communication interface comprises receiving the second data stream at M times the first data rate, wherein M is a positive integer greater than one;

transmitting the sixth data stream via the first communication interface comprises transmitting the sixth data stream at M times the first data rate;

interleaving the plurality of first data streams and the second data stream comprises interleaving i) N first data streams, wherein N is a positive integer greater than one, and ii) the second data stream received via the first communication interface, to generate a third data stream to be transmitted via the second communication interface at N+M times the first data rate; and deinterleaving the fourth data stream into the plurality of fifth data streams and the sixth data stream comprises deinterleaving the fourth data stream into i) N fifth data streams, and ii) the sixth data stream.

18. The method of operating the first multi-port transceiver of claim 10, wherein:

receiving the plurality of first data streams via respective the first ports comprises receiving each first data stream at 2.5 gigabits per second (Gbps);

transmitting the plurality of fifth data streams via respective first ports comprises transmitting each fifth data stream at 2.5 Gbps;

receiving the second data stream via the first communication interface comprises receiving the second data stream at 10 Gbps;

transmitting the sixth data stream via the first communication interface comprises transmitting the sixth data stream at 10 Gbps;

interleaving the plurality of first data streams and the second data stream comprises interleaving i) the plurality of first data streams, each received at 2.5 Gbps, and ii) the second data stream received at 10 Gbps, to generate the third data stream to be transmitted via the second communication interface at 20 Gbps; and deinterleaving the fourth data stream into the plurality of fifth data streams and the sixth data stream comprises deinterleaving the fourth data stream that was received at 20 Gbps into i) the plurality of fifth data streams, each fifth data stream to be transmitted at 2.5 Gbps, and ii) the sixth data stream to be transmitted at 10 Gbps.

* * * * *